United States Patent [19]

Constantino

[11] 4,189,127
[45] Feb. 19, 1980

[54] EXPANDING GATE VALVE

[75] Inventor: Daniel G. Constantino, Mexico City, Mexico

[73] Assignee: FIP, S. A. de C.V., Mexico City, Mexico

[21] Appl. No.: 936,364

[22] Filed: Aug. 24, 1978

[51] Int. Cl.[2] .............................................. F16K 25/00
[52] U.S. Cl. ................................... 251/196; 251/167; 251/199
[58] Field of Search ................ 251/167, 168, 196, 199

[56] References Cited

U.S. PATENT DOCUMENTS

| | | | |
|---|---|---|---|
| 2,002,780 | 5/1935 | Laurent | 251/196 |
| 2,954,960 | 10/1960 | Dunbar | 251/196 |
| 3,036,813 | 5/1962 | Headrick | 251/199 X |
| 3,823,911 | 7/1974 | Natno | 251/196 X |

Primary Examiner—Harold W. Weakley
Attorney, Agent, or Firm—Marvin B. Eickenroht; Jennings B. Thompson

[57] ABSTRACT

There is disclosed a valve having an expanded gate comprising a pair of ported segments each having "V"-shaped, oppositely facing inner surfaces which are yieldably urged into conformity with one another by a pair of leaf springs. Each leaf spring is disposed about a pin on one side of a first segment intermediate its ends, and has one of its ends anchored to the first segment, and the other end anchored to the second segment.

12 Claims, 9 Drawing Figures

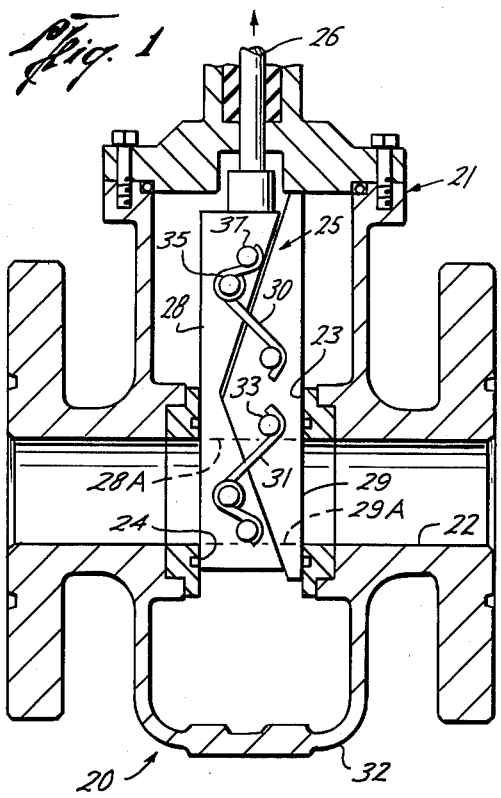
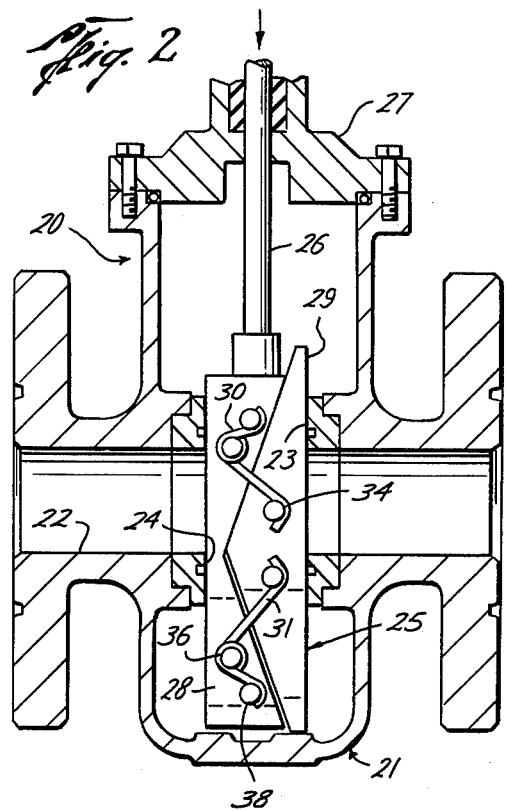
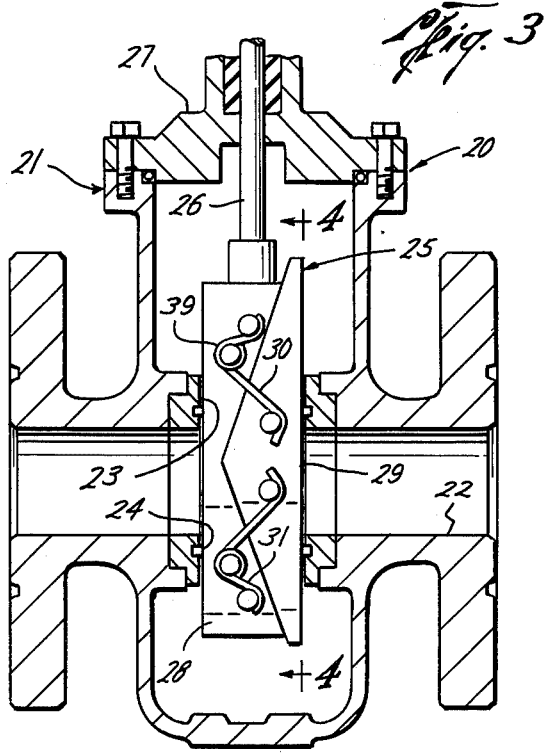
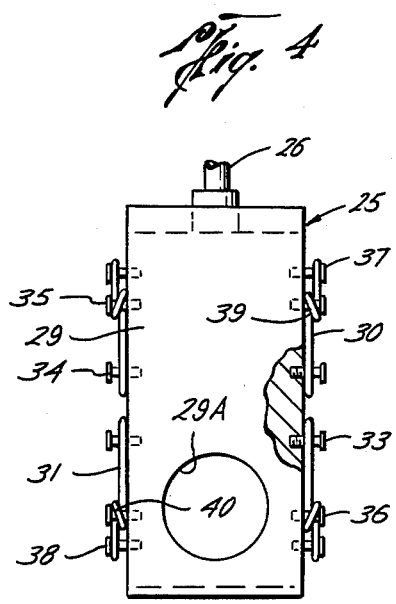

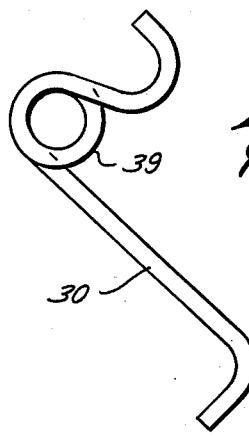
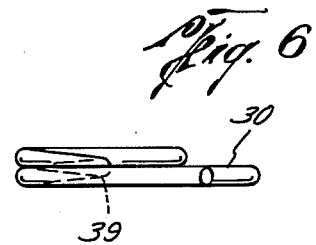
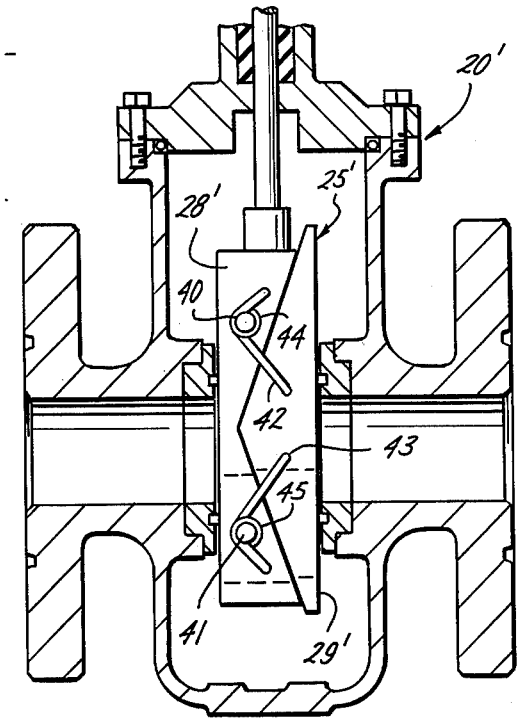
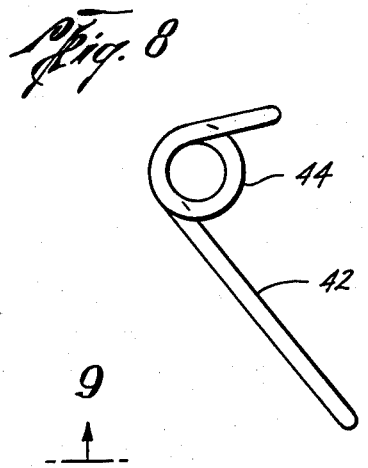
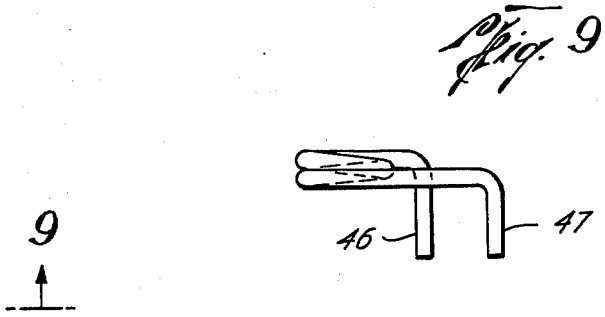

EXPANDING GATE VALVE

This invention relates to improvements in expanding gate valves of the type in which the gate comprises a pair of segments having "V"shaped inner surfaces which are spring-pressed into conformity with one another, so as to minimize the thickness of the gate as it moves longitudinally within a guideway in the body of the valve between opened and closed positions, but which are adapted to be wedged laterally apart with a force which overcomes that of the spring to cause their opposite sides to engage tightly against the guideway as the gate moves into opened and closed positions.

The gate of such a valve is of the through-conduit type wherein ports through the segments are aligned with one another and with the body flowway when the gate is in its open position. As shown, for example, in U.S. Pat. No. 2,954,960, the inner surfaces of the gate segments are held in conformity—i.e., with their apices coinciding—by means of a leaf spring whose midportion is bent over the outer side of a pin on the one segment and whose opposite ends are hooked about the outer sides of a pair of pins on the other segment. Thus, a first of the segments is supported from the second segment as the gate is moved between opened and closed positions by means of a stem secured to the second segment.

As the gate moves into open position, one end of the first segment engages an abutment surface on the valve body to deflect the leaf spring in order to wedge one pair of conforming surfaces apart and thereby expand the opposite sides of the gate through which the ports extend into tight engagement with seating surfaces on the guideway. Conversely, as the gate moves into closed position, another surface on the first segment engages another abutment surface on the valve body to deflect the spring in order to wedge the other pair of conforming surfaces apart and thereby expand the opposite sides of the solid portion of the gate into tight engagement with such seating surfaces.

The spring acts as a simple beam having its ends supported on the pins of the other segment and a load applied to its mid point through the pin of the one segment. In order to maintain the gate as thin as possible, the inner surfaces of its segments form a wide "V"—i.e., they extend at a relatively small angle with respect to the longitudinal direction in which the gate moves. Consequently, while the lateral force urging the inner surfaces of the segment into engagement is relatively large, the longitudinal force supporting one segment from the other is relatively small, so that the spring must be large and heavy, and susceptible to excessive stress.

The primary object of this invention is to provide an expanding gate valve of this type wherein the gate segments are urged into conformity by means which is arranged to provide a relatively large longitudinal component of force for supporting one segment from the other.

These and other objects are accomplished, in accordance with the illustrated embodiments of the present invention, by an expanding gate valve in which the inner surfaces of the gate segments are urged into conformity with one another by a pair of leaf springs each anchored at one end to one segment and at the other end to the other segment so as to act as cantilever beams and arranged to provide a relatively large longitudinal component of force which, due to the relatively large angle which the inner surfaces form with respect to a lateral direction, supplies considerable mechanical advantage in supporting one segment from the other. More particularly, these longitudinal components of force are opposed to one another, and preferably of substantially the same magnitude, so that as one decreases, due to sliding movement of one inner surface along another, the other increases to thereby urge the inner surfaces back into conformity.

More particularly, a pair of longitudinally spaced pins are disposed on one side of a first of the segments, with each leaf spring of the pair of springs having at least one turn intermediate its ends disposed about one pin of the pair, and the ends of the spring being anchored to each of the pair of segments. More particularly, in one embodiment of the invention, a second pair of longitudinally spaced pins are disposed on the first gate segment longitudinally outward of the first pair, a third pair of longitudinally spaced pins are disposed on the second gate segment, and the ends of each spring are hooked about a portion of a pin of each of the second and third pairs of pins to anchor them to the first and second segment. In another illustrated embodiment of the invention, the first and second gate segments have a pair of longitudinally spaced holes in the side thereof corresponding to that on which the first pair of pins is disposed, and the ends of each spring are turned inwardly into the holes in the two segments to anchor them to the first and second gate segments.

In the drawings, wherein like reference characters are used throughout to designate like parts:

FIG. 1 is a vertical sectional view of a gate valve constructed in accordance with the first described embodiment of the invention, and with the gate thereof in open position;

FIG. 2 is a view similar to FIG. 1, but with the gate in closed position;

FIG. 3 is a view similar to FIGS. 1 and 2, but with the gate in a position intermediate opened and closed positions;

FIG. 4 is a view of the gate of the valve of FIGS. 1 to 3, as seen along broken lines 4—4 of FIG. 3, FIG. 5 is an enlarged plan view of one of the leaf springs which urges the inner surfaces of the gate segments of FIGS. 1 to 4 into conformity;

FIG. 6 is an end view of the spring of FIG. 5, as seen along broken line 6—6 of FIG. 5;

FIG. 7 is a vertical sectional view of a gate valve constructed in accordance with the second described embodiment of the invention, and with the gate thereof shown in a position intermediate opened and closed positions;

FIG. 8 is an enlarged plan view of one of the springs which urges the inner surfaces of the segments of the gate of the valve of FIG. 7 into conformity; and FIG. 9 is an end view of the spring of FIG. 8, as seen along broken lines 9—9 of FIG. 8.

With reference now to the details of the abovedescribed drawings, the gate valve shown in FIGS. 1 to 3, and indicated in its entirety by reference character 20, includes a valve body 21 having a flowway 22 therethrough and a guideway 23 intersecting the flowway to form seating surfaces 24 on its opposite sides in surrounding relation to the flowway. A gate 25 is movable within the guideway between the open position of FIG. 1, wherein a passageway therethrough is aligned with the flowway 22, and the closed position of FIG. 2, wherein a solid portion thereof is disposed across the flowway.

The gate is moved between opened and closed positions by means of a stem 26 extending sealably through a bonnet 27 on the valve body for connection to a suitable operator (not shown).

As previously described, gate 25 is of the expanding type comprising first and second segments 28 and 29, each having inner "V" shaped surfaces which are urged into conformity with one another by springs 30 and 31 anchored at their opposite ends to the pair of segments. More particularly, and as shown, the inner surfaces are complementary to one another and form relatively wide "V", so as to extend at a relatively small angle with respect to the direction of longitudinal movement of the gate between its opened and closed positions.

Gate segment 28, on which the concave inner surfaces are formed, is suspended from stem 26 for longitudinal movement therewith, and gate segment 29, on which the convex surfaces are formed, is supported from segment 28 by springs 30 and 31. When the gate is intermediate its opened and closed positions, as shown in FIG. 1, these inner surfaces are urged into conformity with one another so that their apices coincide. However, when the gate is moved upwardly toward its open position of FIG. 1, the upper end of segment 29 engages an inner, downwardly facing surface of bonnet 27, so that continued upward movement of segment 28 will overcome the force of the springs to cause the lower inner surface of segment 29 to slide downwardly along the lower inner surface of segment 28, and thereby spread the opposite outer faces of the gate apart and into tight engagement with the seating surfaces 24 on opposite sides of the guideway. As the gate segment 29 moves downwardly and outwardly with respect to gate segment 28, a port 29A therethrough is moved into alignment with a port 28A through the gate segment 28 so as to form the passageway through the gate which is aligned with the valve body flowway 22.

As the gate moves downwardly from its open position, segment 28 initially moves downwardly with respect to segment 29 so as to bring the inner surfaces of the segments into conformity and thus lessen the thickness of the gate to permit it to move freely between the seating surfaces 24 of the valve body. As the gate approaches closed position, the lower end of segment 29 engages an upwardly facing surface on a depending well portion 32 of the valve body, so that continued downward movement of segment 28 by means of stem 26 will cause the upper inner surface of segment 28 to slide downwardly over the upper inner surface of segment 29, thereby forcing the outer faces of the gate apart and into tight engagement with seating surfaces 24. Then, of course, when the gate is moved back to its open position, lifting of segment 28 by mans of stem 26 will permit the springs 30 and 31 to return the inner surfaces of the segments into conformity and thereby again lessen the width of the gate 25 as it moves back to open position.

Gate segment 29 has a first pair of longitudinally spaced pins 33 and 34 disposed on opposite sides thereof, and gate segment 28 has a second pair of longitudinally spaced pins 35 and 36 disposed on its opposite sides, with the second pair of pins being longitudinally spaced outwardly of the first pair. More particularly, a third pair of pins 37 and 38 are disposed on each side of segment 28 in longitudinally spaced-apart relation longitudinally outwardly of the pins of the second pair, and laterally inwardly thereof toward the axis of movement of the gate—i.e., laterally intermediate the first and second pair of pins.

Spring 30 has a turn 39 intermediate its opposite end which is disposed about pin 35, and spring 31 has a turn 40 intermediate its opposite ends which is disposed about pin 36. The opposite ends of the springs 30 and 31 are anchored to the segments of the gate and arranged to urge the segments into conformity with one another by a force due to a cantilever beam portion thereof intermediate the first and second pair of pins. For this purpose, one end of spring 30 is hooked about pin 37, and the other end thereof is hooked about pin 34, while one end of spring 31 is hooked about pin 33 and the other end thereof is hooked about pin 38.

As will be appreciated, and as compared with the leaf spring of U.S. Pat. No. 2,954,960, the force of the cantilever beam portion of each spring (between the first and second pair of pins) has a vertical as well as a horizontal component. The amount of the vertical component is determined by the inclination of such portion with respect to the lateral, and thus may be made larger or smaller by rearranging the positions of the first and second pair of pins relative to one another. Furthermore, and as previously described, the turn of each spring intermediate its ends, and disposed about the second pair of pins 35 and 36, adds to the length of its cantilever beam portion, and thus to the force with which each leaf spring acts in urging the gate segments into conformity with one another.

As illustrated, springs 30 and 31 are symmetrical with one another—i.e., each is of the same length and anchored in the same manner as the other so that its cantilever beam portion extends at the same angle with respect to the longitudinal axis of the gate. As a result, each exerts an equal, but oppositely directed, vertical component of force, so that, as the gate spreads, upon movement into its opened and closed positions, the vertical force component of one spring will increase, while that of the other will decrease, thereby constantly urging the gate into conformity.

The basic construction of the expanding gate valve of the second embodiment of the invention is, as shown in FIG. 7, identical to that of the first embodiment of FIGS. 1 and 3, so that identical parts thereof are assigned the same reference characters, except for the addition of a prime. The only way in which valve 20' differs from valve 20 is the manner in which the inner surfaces of the segments 28' and 29' of the gate 25' are urged into conformity with one another, and the following description will therefore be devoted thereto.

In valve 20', the segments are so urged by means which includes a pair of pins 40 and 41 disposed in longitudinally spaced-apart relation on the sides of gate segments 28' similarly to pins 35 and 36 of valve 20. A pair of springs 42 and 43, which are similar to springs 30 and 31 in that each includes a turn intermediate its opposite ends disposed about one of the pins, have their opposite ends anchored to the segments. Thus, spring 42 includes a turn 44 disposed about pin 40, while spring 43 includes a turn disposed about pin 41.

Each segment 28' and 29' has a pair of longitudinally spaced holes therein, the holes in segments 28' being spaced longitudinally outwardly of the holes in segment 29' and located similarly to the pairs of pins disposed on the opposite sides of the gate segments of valve 20. That is, the outermost pair of holes formed in gate segment 28' are in generally the same positions as the pins 37 and 38, while the holes formed in gate segment 9' are in generally the same position as the pins 33 and 34. These holes receive inwardly turned portions of the ends of the springs 42 and 43 so as to anchor the ends of the springs in the same positions relative to one another that they are anchored in the first embodiment. Thus, spring 42 has an inwardly turned portion 46 which is received in the uppermost hole of segment 28' and an inwardly turned portion 47 which is received in the uppermost hole of segment 29'. Obviously, the other spring 43 would have corresponding inwardly turned end portions for disposal within the lowermost holes in the segments 28' and 29'.

Since the pins 40 and 41 are disposed in the same positions on segments 28' as are the pins 35 and 36 on the segment 28, and further since the springs 42 and 43 have their opposite ends anchored in the same positions as the ends of the springs of the valve 20, the segments 28' and 29' will be urged into conformity with one another with the same forces and in the same manner previously described with respect to the valve 20.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiment may be made of the invention without departing from the scope thereof, it is to be understood that all matter herein set forth or shown in the accompanying drawings is to be interpreted as illustrative and not in a limiting sense.

The invention having been described, what is claimed is:

1. An expanding gate valve, comprising a body having a flowway therethrough and a guideway intersecting the flowway to form seating surfaces about the flowway on both sides of the guideway, an expanding gate comprising a pair of ported segments each having "V" shaped, oppositely facing inner surfaces, and means yieldably urging said surfaces into conformity with one another, means for moving the gate longitudinally between an open position in which the ports in the segments are substantially aligned with one another and the flowway, and a closed position in which solid portions of the segments are disposed across the flowway, one of said segments being engageable with abutment surfaces of the body so as to cause an inner surface of the one segment to slide along an oppositely facing inner surface of the other segment, and thereby spread said segments, as the gate moves into each of its opened and closed positions, and said means yieldably urging the inner surfaces of the segments into conformity comprising a pair of longitudinally spaced pins on one side of a first of the segments, and a pair of leaf springs each being disposed about a pin intermediate its ends, and having one end anchored to the first segment, and the other end anchored to the second segment.

2. An expanding gate of the character defined in claim 1, wherein each leaf spring has at least one turn disposed about the pin.

3. An expanding gate valve of the character defined in claim 1, wherein the second segment has a second pair of longitudinally spaced pins which are disposed longitudinally outwardly of the first pair, the first segment has a pair of pins, and the ends of each spring are hooked about portions of the pin of each of the second and third pairs to anchor them to the first and second segments.

4. An expanding gate valve of the character defined in claim 3, wherein each leaf spring has at least one turn disposed about the pin.

5. An expanding gate valve of the character defined in claim 1, wherein the second segment has a pair of longitudinally spaced holes in the one side thereof, and the other end of each spring is turned inwardly into one of the holes to anchor it to the second segment.

6. An expanding gate valve of the character defined in claim 5, wherein each leaf spring has at least one turn disposed about the pin.

7. A gate assembly for an expanding gate valve, comprising a pair of segments adapted to be moved longitudinally between opened and closed positions within a body of the valve, each segment having a laterally expanding port therethrough and "V" shaped, oppositely facing inner surfaces, and means yieldably urging said surfaces into conformity with one another, said means comprising a pair of longitudinally spaced pins on one side of a first of the segments, and a pair of leaf springs each being disposed about a pin intermediate its ends, and having one end anchored to the first segment and the other end anchored to the second segment.

8. A gate assembly of the character defined in claim 7, wherein each leaf spring has at least one turn disposed about the pin.

9. A gate assembly of the character defined in claim 7, wherein the second segment has a second pair of longitudinally spaced pins which are disposed longitudinally outwardly of the first pair, the first segment has a pair of pins, and the ends of each spring are hooked about portions of the pin of each of the second and third pairs to anchor them to the first and second segments.

10. A gate assembly of the character defined in claim 9, wherein each leaf spring has at least one turn disposed about the pin.

11. A gate assembly of the character defined in claim 7, wherein the second segment has a pair of longitudinally spaced holes in the one side thereof, and the other end of each spring is turned inwardly into one of the holes to anchor it to the second segment.

12. A gate assembly of the character defined in claim 11, wherein each leaf spring has at least one turn disposed about the pin.

* * * * *